United States Patent
Skarda et al.

(10) Patent No.: US 9,240,625 B2
(45) Date of Patent: Jan. 19, 2016

(54) EXPANDABLE IN-WALL ANTENNA FOR A SECURITY SYSTEM CONTROL UNIT

(71) Applicant: Vivint, Inc., Provo, UT (US)

(72) Inventors: Brian V. Skarda, Provo, UT (US); Chester Ferry, Pleasant Grove, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 14/210,926

(22) Filed: Mar. 14, 2014

(65) Prior Publication Data
US 2014/0273865 A1 Sep. 18, 2014

Related U.S. Application Data (60) Provisional application No. 61/793,352, filed on Mar. 15, 2013.

(51) Int. Cl.
*H01Q 1/08* (2006.01)
*H01Q 7/02* (2006.01)
*H04B 7/24* (2006.01)
*H01Q 9/16* (2006.01)

(52) U.S. Cl.
CPC .............. *H01Q 1/084* (2013.01); *H01Q 7/02* (2013.01); *H04B 7/24* (2013.01); *H01Q 9/16* (2013.01)

(58) Field of Classification Search
CPC ............................................. H01L 2223/6677
USPC .............. 455/63.4, 66.1, 550.1, 562.1, 575.7
See application file for complete search history.

(56) References Cited

U.S. PATENT DOCUMENTS

| 6,512,496 B2 | 1/2003 | Alexeff et al. |
| 7,724,134 B2 | 5/2010 | Icove et al. |

(Continued)

FOREIGN PATENT DOCUMENTS

| JP | 2011107898 | 6/2011 |
| KR | 1020010084154 | 9/2001 |
| WO | 2005/057516 | 6/2005 |

OTHER PUBLICATIONS

2GIG Ant1X External In-Wall GSM Antenna, obtained from http://rundistribution.com/index.php/security/intrusion-burglar-alarms/2gig-ant1x-external-in-wall-gsm-antenna.html, on Oct. 14, 2013.

(Continued)

*Primary Examiner* — Tuan H Nguyen
(74) *Attorney, Agent, or Firm* — Holland & Hart LLP (57) ABSTRACT

The present disclosure relates to an expandable antenna for a security system that is installed within a wall. The security system may include a control unit. The control unit may include a casing that houses one or more internal components of the control unit and a radio-frequency (RF) communication module that is situated within the casing. The RF communication module includes an antenna connected that is exposed to the exterior of the casing. An expandable antenna connects to the antenna connector. The expandable antenna is fit through an aperture in a wall and is then expanded to an enlarged size within the gap of the wall.

20 Claims, 9 Drawing Sheets

(56) References Cited

U.S. PATENT DOCUMENTS

| | | | |
|---|---|---|---|
| 7,859,407 B2 * | 12/2010 | Hall et al. | 340/568.1 |
| 7,864,121 B2 | 1/2011 | Suprunov et al. | |
| 8,015,972 B2 * | 9/2011 | Pirzada | 128/204.21 |
| 2003/0098791 A1 | 5/2003 | Carlson et al. | |
| 2006/0001592 A1 | 1/2006 | Chang | |
| 2010/0188219 A1 | 7/2010 | Todd | |
| 2010/0197222 A1 | 8/2010 | Scheucher | |
| 2011/0260865 A1 | 10/2011 | Bergman et al. | |
| 2013/0201316 A1 * | 8/2013 | Binder et al. | 348/77 |

OTHER PUBLICATIONS

Listen Technologies Corporation, "LA-122 Univeresal Antenna Kit (72 and 216 MHz) User's Manual", pp. 1-18, 2008.

International Search Report issued for PCT/US2014/028335 on Aug. 14, 2014.

English Abstract for KR1020010084154. Sep. 6, 2001.

English Abstract for JP2011107898. Jun. 2, 2011.

* cited by examiner

EXPANDABLE IN-WALL ANTENNA FOR A SECURITY SYSTEM CONTROL UNIT

CROSS-REFERENCE TO RELATED APPLICATIONS

The present Application claims priority to U.S. Provisional Patent Application No. 61/793,352, titled: "Expandable In-Wall Antenna for a Security System Control Unit," filed on Mar. 15, 2013.

TECHNICAL FIELD

This disclosure relates generally to security systems and, more specifically, to control units with an expandable in-wall antenna.

BACKGROUND

Security systems are widely used to protect property and provide personal safety. Security systems generally include a control unit that controls the overall operation of the system, one or more keypads providing user access to the system, and various detectors and sensors.

Security systems may generate an alarm in response to any number of events, such unauthorized entry, fire, medical emergency or manual alarm activation. The security system may be associated with a service that remotely monitors the status of the security system. Thus, if the security system generates an alarm, a notification signal may be transmitted via a wired and/or wireless communications link to a monitoring system. Upon receiving the notification, security service personnel for the monitoring system may attempt to contact the property owner or other party at the facility to verify the alarm. If it is appropriate to do so, a security service representative may, upon confirmation of the alarm, contact an emergency response agency such as the police department, the fire department, an emergency medical team, or other appropriate entity. Security systems are also playing a larger role in building automation, and may include a control unit that provides building automation features.

The control unit often communicates wirelessly with one or more of the devices in the system. As a result, the control unit requires antennas to allow radio frequency (RF) communications. A single control unit may require antennas for Z-Wave communications, Wi-Fi communications, Global System for Mobile Communications (GSM) communications, or others.

Designing antennas to fit within the enclosure of the control unit poses challenges. The control unit, with its various electronic components, is a "noisy" environment and antennas need to be protected from electromagnetic interference (EMI). The antennas must also be small enough to fit within the casing for the control unit. An antenna designer may have to compromise other characteristics of the antenna (such as efficiency, bandwidth, and gain) to create an antenna with the necessary dimensions. At the same time, there are benefits to keeping the antennas within the control unit; for example, the control unit casing protects the antennas from physical damage and from the elements. An external antenna can also be unsightly. In some situations, it would be desirable to have an antenna for a control unit that can be external to the control unit, but without the dangers of exposure.

BRIEF SUMMARY

Disclosed herein are devices and approaches to providing an expandable antenna for a security system. One embodiment may include an expandable antenna that may be installed within a wall to which the control unit for the security system is mounted.

In one embodiment, the control unit for the security system may include a casing for housing one or more internal components of the control unit. The casing may contain an RF communication module that includes an antenna connector exposed to the exterior of the casing. The control unit may also include an expandable antenna that connects to the antenna connector and fits within an aperture in a wall to which the control unit is mounted. The antenna may expand to an enlarged size within the gap of the wall.

The RF communication module that uses the expandable antenna may be a Global Systems for Mobile Communications (GSM) communication module. The control unit may include other RF communications modules, such as Z-Wave communications modules, Wi-Fi communications modules, and others. The additional RF communication modules may have internal antennas within the casing, or may have their own expandable antennas situated within the gap of the wall.

The expandable antenna may connect to a transmissions cable that may communicatively connect the expandable antenna to the antenna connector. A stopper may be situated at the proximal end of the cable component to prevent the proximal end of the cable component from passing through the aperture in the wall. The stopper may make installation easier and reduce the possibility of losing the expandable antenna within the gap of the wall.

The expandable antenna may be a loop antenna with an expander that expands the loop antenna from an elongated shape to a substantially circular loop shape. The expandable antenna may be a dipole antenna that includes an expander for changing the orientation of the first pole of the dipole antenna to the second pole of the dipole antenna from a substantially parallel orientation to a substantially aligned orientation. Other antenna configurations (such as telescoping monopole, slot, patch, helical, or other) may also be used.

Also disclosed is a method for installing an expandable antenna. The method may involve creating an aperture in an exterior section of a wall and inserting an expandable antenna, in its compact state, into the aperture such that the antenna is behind the exterior section of the wall. The aperture may be sized such that it is larger than the expandable antenna while in its compact state along at least one dimension, and such that it is larger than the size of the stopper component for the antenna. The method may also involve, following insertion of the expandable antenna into the aperture, expanding the antenna from the compact state to an expanded state, and connecting the antenna to the antenna connector of the control unit. The method may also involve mounting the control unit to the exterior section of the wall and, where the expandable antenna is used for a GSM communications module, establishing a connection between the control unit and a remote server using a GSM connection.

Other aspects, as well as features and advantages of various aspects, of the present disclosure will become apparent to those of skill in the art though consideration of the ensuing description, the accompanying drawings and the appended claims.

BRIEF DESCRIPTION OF THE DRAWINGS

A further understanding of the nature and advantages of the embodiments may be realized by reference to the following drawings. In the appended figures, similar components or features may have the same reference label.

While the embodiments described herein are susceptible to various modifications and alternate forums, a specific embodiment has been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Referring in general to the accompanying drawings, various embodiments of the present disclosure are illustrated to show the structure and methods for installing a component within a system, such as a security system. Common elements of the illustrated embodiments are designated with like numerals. It should be understood that the figures presented are not meant to be illustrative of actual views of any particular portion of the actual device structure, but are merely schematic representations which are employed to more clearly and fully depict embodiments of the disclosure.

The following provides a more detailed description of ways to implement the present disclosure and various representative embodiments thereof. In this description, functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other solutions. For the most part, details concerning timing considerations and the like have been omitted where such details are not necessary to obtain a complete understanding of the present disclosure and are within the abilities of persons of ordinary skill in the relevant art.

In this description, some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

Figure 1:
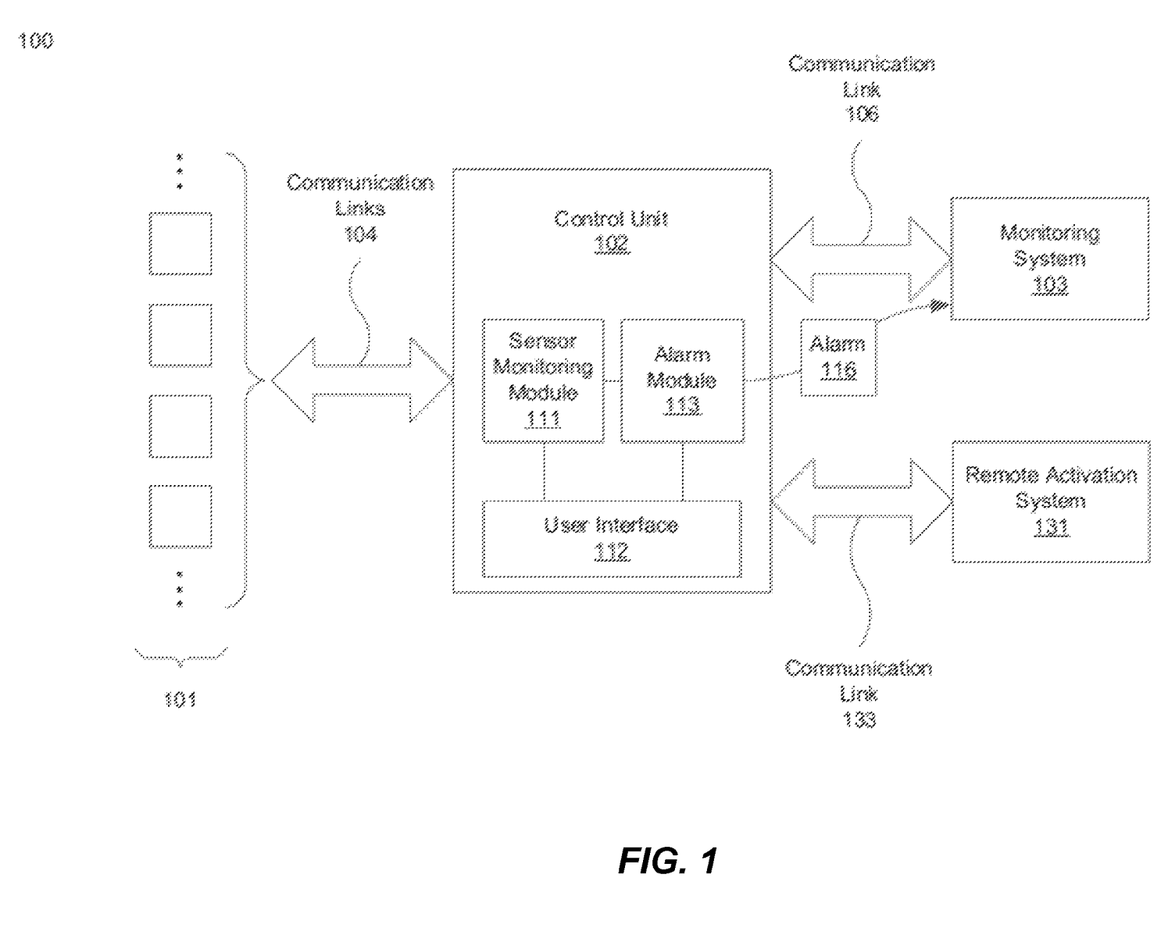
FIG. 1 illustrates one embodiment of an exemplary security system.

FIG. 1 illustrates an embodiment of a security system 100, which may also be referred to as an "alarm system." The security system 100 includes sensors 101 (also referred to as security sensors), a control unit 102, monitoring system 103, and remote activation system 131. Communication links 104 (which may be a combination of wired and wireless communication links) couple sensors 101 to control unit 102. Wired communication links can include circuit loops that are either detected as closed or open. In some embodiments, sensors 101 and control unit 102 are located in the same facility, such as in the same residence or in the same building. Communication link 106 (which may be a wired telephone connection, wired or wireless network connection, cellular connection, etc., or combination thereof) may couple the control unit 102 to monitoring system 103. In other embodiments, the system shown in FIG. 1 may be implemented without a monitoring system 103. In certain embodiments, the monitoring system 103 may communicate with multiple control units 102 belonging to other security systems.

Sensors 101 monitor for certain events and report relevant events to the control unit 102. Sensors 101 may include any of a variety of different types of sensors, such as door and window sensors, motion sensors, glass break sensors (e.g., sensors that detect a physical break or detect the sound of a glass break), etc. The control unit 102 may be configured to monitor sensors 101 for alarm conditions via communication links 104 and to relay alarms to the monitoring system 103 via communication link 106. The sensors 101 may, in response to detecting an alarm condition, send an alarm condition message to the control unit 102.

In certain embodiments, one or more of the sensors 101 may monitor conditions other than security-related conditions. For example, one or more sensors 101 may monitor energy usage within the home, temperature, ambient light levels, and other conditions. The control unit 102 may receive the measurements from the sensors 101 and provide them to the user of the system or use them in providing building automation services.

Control unit 102 may include sensor monitoring module 111, user interface 112, and alarm module 113. Sensor monitoring module 111 may be configured to monitor sensors 101. Sensors 101 may sense and/or indicate a change in their physical surroundings (e.g., a normally closed connection becomes open, a signal indicating the sound of breaking glass was detected, etc.) which may be indicative of an unauthorized access, fire, or other event. The sensors 101 may communicate messages on communication links 104. For example, a circuit connected to a door sensor may transition from closed to open (or to a resistance exceeding a predetermined resistance threshold) indicating a door has been opened. A motion sensor may send an electrical signal indicative of the detected motion. Sensor monitoring module 111 may monitor communication links 104 for alarm condition messages sent from sensors 101. Upon sensor monitoring module 111 receiving an alarm condition message signaling the occurrence of an alarm condition, sensor monitoring module 111 may send a signal to alarm module 113.

The alarm module 113 may validate the alarm condition has occurred before communicating with the monitoring system 103 or generating an alarm using the alarm 116. For example, the alarm module 113 may validate an alarm condition that indicates a window is open when the security system is on, but may not validate the same alarm condition when the security system is off.

The alarm module 113 may cause an alarm 116 to generate an alarm in response to validating the alarm condition. The alarm 116 may provide an audio signal (such as beeping, audio instructions, or other suitable audio), a visual signal (such as a flashing light) or a combination thereof to alert a user to the alarm condition. Where the control unit 102 is associated with one or more controllers providing building automation features, the control unit 102 may also use those features to provide an alarm. For example, the control unit 102 may flash one or more interior lights as part of the alarm.

User interface 112 may include an input interface and an output interface. The input interface may comprise a physical input interface or virtual input interface that may include a numeric key pad (e.g., for entering a disarm code, etc.), sensor activation buttons, physical duress buttons, or other input/output devices. The input interface may include a condenser for receiving audio input and/or communicating with monitoring system 103. The output interface may include an output display device that displays system status, such as armed and disarmed, sensors/zones that have detected change in physical surroundings, and other relevant information. The output interface may also include a speaker that audibly outputs information similar to that displayed on the output display device. The speaker may also be used by monitoring system 103 to communicate with a user of control unit 102. Other input/output approaches may also be implemented as part of the user interface 112.

The control unit 102 may also communicate over a communication link 133 with a remote activation system 131. The remote activation system 131 may allow a user to interact with the control unit 102 remotely. For example, the user may be able to arm and disarm the security system 100 from a mobile device such as a cellular phone using the remote activation system 131. In one embodiment, the remote activation system 131 may include software installed on the mobile device of the user.

Figure 2:
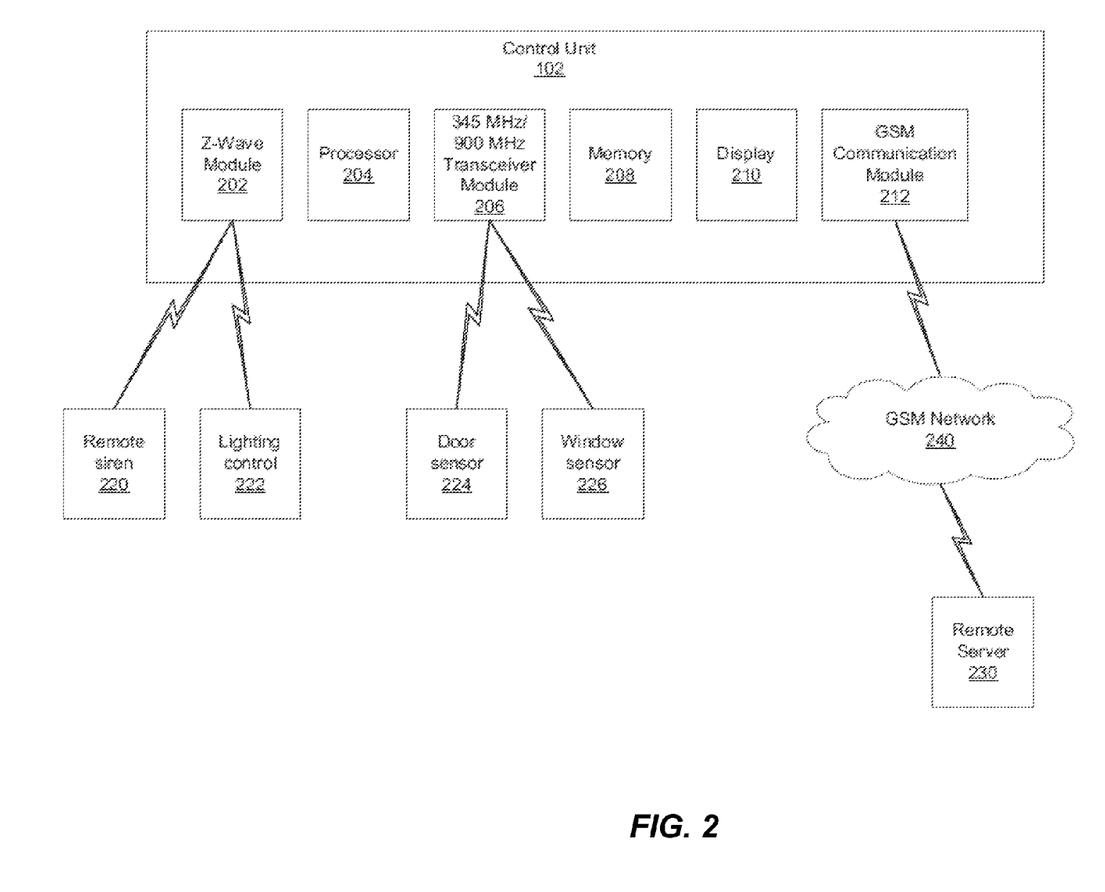
FIG. 2 is a block diagram of an exemplary embodiment of a control unit of a security system that includes a plurality of RF communication modules.

FIG. 2 is a block diagram of an exemplary embodiment of a control unit 102. The control unit 102 may include a Z-Wave module 202, a processor 204, a transceiver module 206, a memory 208, a display 210, and a Global System for Mobile Communications (GSM) communication module 212. The control unit 102 may include other components than those shown in FIG. 2.

Generally, the control unit 102 may operate under control of an operating system stored in memory 208, and include interface with a user to accept inputs and commands and to present outputs. The display 210 may be part of the interface and present information to users of the control unit 102. The display 210 may be a liquid crystal display (LCD) device, or other suitable display mechanism. In certain embodiments, the display 210 may be a touch-screen device and may act as an input component of the interface for the control unit 102.

Control unit 102 may also implement a compiler (not shown) which may allow one or more application programs (not shown) written in a programming language to be translated into processor-readable code. Instructions implementing an application program may be tangibly embodied in a computer-readable medium. Further, an application program may include instructions which, when read and executed by processor 204, may cause processor 204 to perform the steps necessary to implement and/or use embodiments of the present disclosure. It is noted that an application program and/or operating instructions may also be tangibly embodied in memory 208 and/or data communications devices, thereby making a computer program product or article of manufacture according to an embodiment the present disclosure. As such, the term "application program" as used herein is intended to encompass a computer program accessible from any computer readable device or media. Furthermore, portions of the application program may be distributed such that some of the application program may be included on a computer readable media within control unit 102, and some of the application program may be included in a remote device, such as a remote computer.

The Z-Wave module 202 may be a radio-frequency (RF) communication module that facilitates radio communication according to the Z-Wave wireless communication protocol. As used herein, an RF communication module refers to a module that facilitates RF communication. As shown in FIG. 2, the Z-Wave module 202 may communicate with a remote siren 220 and a lighting control 222 unit. The Z-Wave module 202 may allow the control unit 102 to provide control and monitoring for the facility. For example, the Z-Wave module 202 may communicate with door locks, thermostats, and other components. In such embodiments, the control unit 102 may be able to provide automation features such as controlling lighting, locks, heating, air conditioning, and activating remote sirens, among other functions.

The control unit 102 may also include additional RF communication modules, such as the transceiver module 206 and the GSM communication module 212. The 345 MHz/900 MHz transceiver module 206 may be used for communicating with certain sensors 101 in the security system, such as a door sensor 224 and a window sensor 226 illustrated in FIG. 2. Other examples of sensors include, but are not limited to, passive infrared (PIR) motion sensors, glass break sensors, carbon monoxide sensors, smoke sensors, panic buttons, and other sensors 101 and devices. The 345 MHz/900 MHz transceiver module 206 may include a high-gain, narrow-band radio receiver that allows the 345 MHz/900 MHz transceiver module 206 to communicate with sensors 101 in remote locations or RF unfriendly environments.

The GSM communication module 212 may allow communications according to the GSM standard over a cellular network such as the GSM network 240. The GSM communication module 212 may allow the control unit 102 to wirelessly communicate with a remote server 230 over the GSM network 240. The remote server 230 may be associated with the monitoring system 103. The control unit 102 may provide voice and/or data communication with one or more remote devices using the GSM communication module 212.

The control unit 102 may implement other RF communication modules in addition to, or instead of, those shown in FIG. 2. For example, the control unit 102 may include a Bluetooth module facilitating Bluetooth communication, a Wi-Fi module facilitating Wi-Fi communication, a radio frequency identification (RFID) module for RFID communications, and others. The RF communication modules may require an antenna to send and/or receive RF signals necessary for communication with connected devices.

Figure 3:
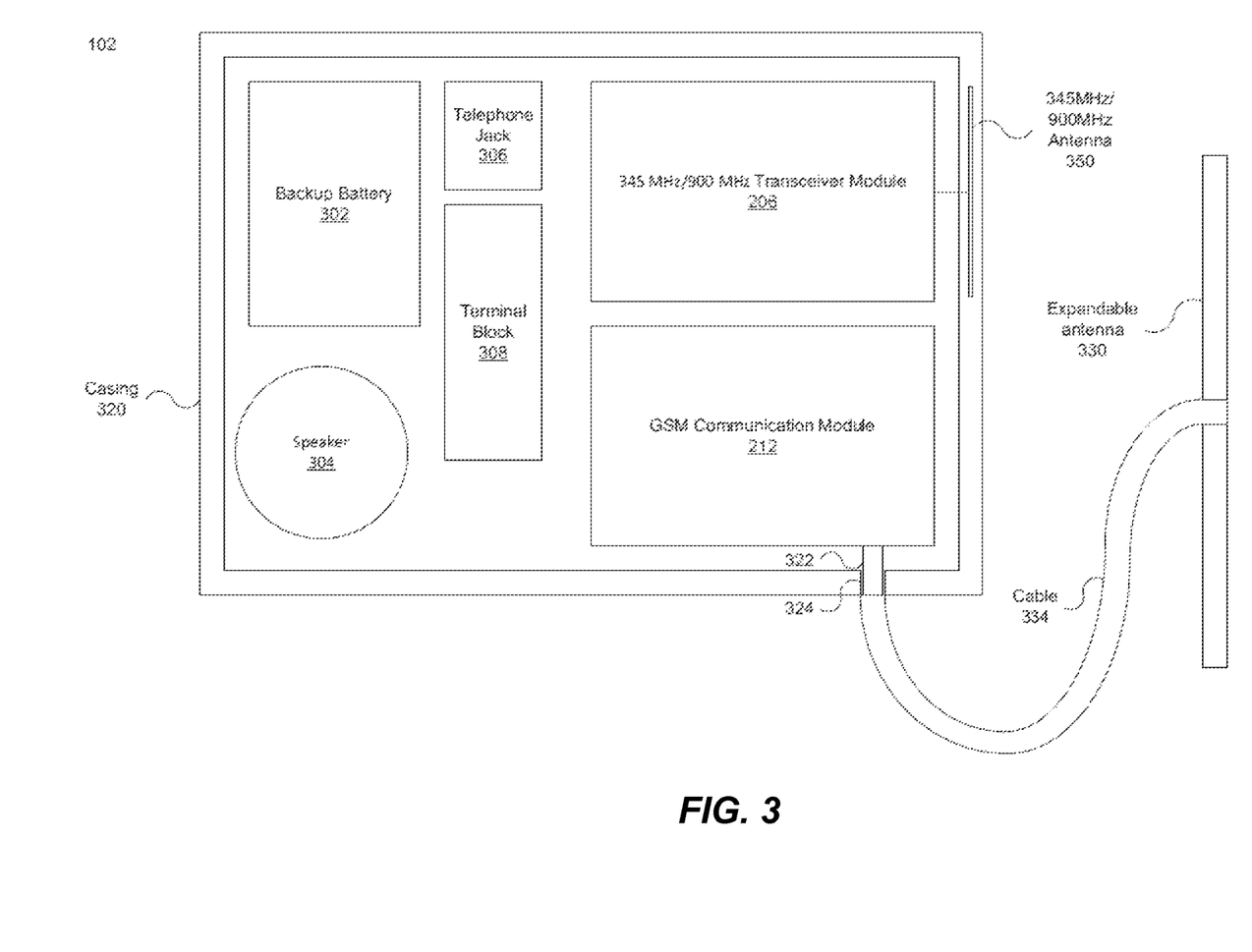
FIG. 3 is an illustration of the back of one exemplary embodiment of a control unit that connects to an expandable antenna that is external to the control unit.

FIG. 3 illustrates one embodiment of a control unit 102. The control unit 102 may include a casing 320 and various internal components within the casing 320. The casing 320 may house internal components of the control unit 102 and may provide a physical structure to contain and protect the internal components. The casing 320 may be made of plastic or other suitable materials.

The control unit 102 may also include a backup battery 302 to provide power in the event that power from a main power supply is lost. The backup battery 302 may be a 7.2 Volt Ni-mh battery pack. The backup battery 302 may be rechargeable. The control unit 102 may include a speaker 304 for sounding local alarms, providing voice prompts and system sounds, and providing communication with a monitoring system 103, among other functions. A telephone jack 306 may be included in the control unit 102 and may a RJ45 connection which may allow wired communications to occur over a public switched telephone network. The control unit 102 may include a terminal block. The terminal block 308 may provide the control unit 102 with connections for power, a solid state output bell, and hardwire loops, among other functions.

FIG. 3 also illustrates a 345 MHz/900 MHz antenna 350 for the 345 MHz/900 MHz transceiver module 206. The 345 MHz/900 MHz antenna 350 may be an internal antenna which may be internal to the control unit 102. The 345 MHz/900 MHz antenna 350 may be within the 345 MHz/900 MHz transceiver module 206 or within the control unit 102. In the embodiment shown in FIG. 3, the 345 MHz/900 MHz antenna 350 is situated within a wall defined by the casing 320.

In some embodiments as shown in FIG. 3, the GSM communication module 212 may be situated within the casing 320. The GSM communication module 212 may include an antenna connector 322 exposed to the exterior of the casing 320. In the depicted embodiment, the casing 320 may include an aperture 324 and the antenna connector 322 may be situated at the aperture 324 such that it is exposed. The antenna connector 322 may be a TNC connector, a FME connector, or any other suitable connector. The antenna connector 322 may be a male or female connector.

FIG. 3 also illustrates an expandable antenna 330 which may be connected to the antenna connector 322 through a cable 334. The expandable antenna 330 may connect directly to the antenna connector 322 or it may indirectly connect (i.e., with one or more intervening components) to the antenna connector 322. As discussed in greater detail in connection with later figures, the expandable antenna 330 may have a compact state and an expanded state. While in its compact state, the expandable antenna 330 may fit within an aperture through a wall to which the control unit 102 may be mounted. After insertion, the expandable antenna 330 may be expanded to its expanded state (shown in FIG. 3). Because the expandable antenna 330 may be external from the control unit 102, the EMI generated by various components of the control unit 102 may be less likely to interfere with and complicate RF communications using the expandable antenna 330. Freed from the confines of the casing 320, a larger variety of antenna designs may be available to improve performance thereof. In addition, because the expandable antenna 330 may be situated within the wall, it is may be protected from damage and hidden from view.

The expandable antenna 330 may expand to an enlarged size within the space of the wall. As used herein, "an enlarged size" refers to a size that is larger in at least one dimension. Thus, an expandable antenna 330 may expand to an enlarged size if it expands to a greater width, even if the length of the expandable antenna 330 decreases as part of the expansion. The term "expanded state" refers to a state in which the expandable antenna 330 has expanded in at least one direction. In a typical embodiment, the expandable antenna 330, in its compact state, may fit through an aperture in a wall that it cannot fit through in its expanded state.

In other embodiments, more than one of the radio-frequency communications modules connect to separate expandable antennas. For example, in one embodiment, the 345 MHz/900 MHz antenna 350 may be an expandable antenna installed within the wall to which the control unit 102 may be attached. In such embodiments, more than one aperture in the wall may be necessary to accommodate multiple antennas for various radio-frequency communications modules.

The expandable antenna 330 may connect to a cable 334 that is a transmission line and allows signals to be sent and received from the expandable antenna 330. The cable 334 may be a specialized cable designed to carry an alternating current at frequencies associated with RF communications. In typical embodiments, the cable 334 may be relatively short and losses in the cable 334 may not adversely impact performance of the expandable antenna 330 or the GSM communication module 212.

Figure 4:
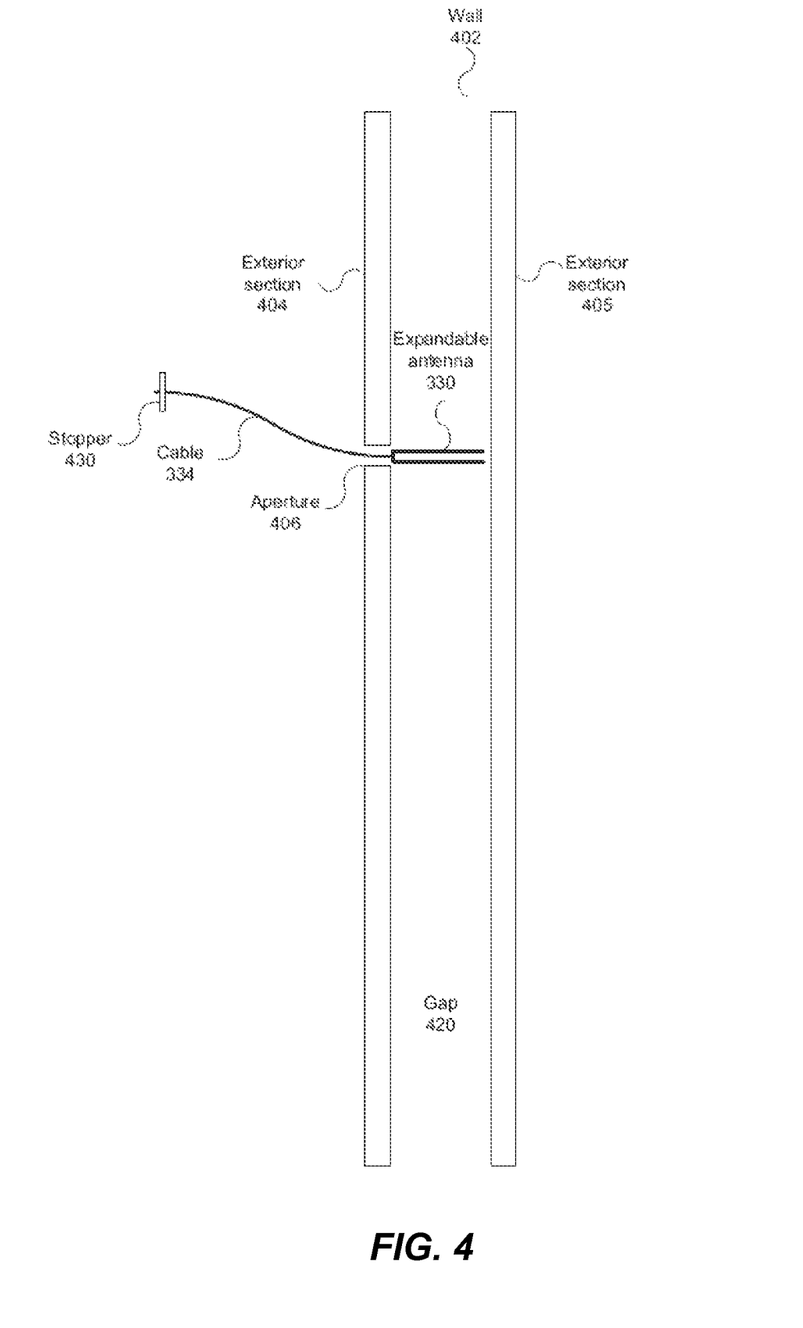
FIG. 4 is an illustration illustrating insertion of an expandable antenna into a gap within a wall.

FIG. 4 illustrates an expandable antenna 330 being inserted into an aperture 406 of an interior wall 402. In many embodiments, a wall 402 in a facility has exterior sections 404, 405 and a gap 420 between. The exterior sections 404, 405 may be made of drywall, plaster, wood, or other suitable material, and are typically mounted to studs. Electrical cords, insulation, pipes, and other components may also be within the gap 420 between the exterior sections 404, 405.

The expandable antenna 330 may be compatible with any suitable RF communication module, such as a GSM communication module, a Z-Wave communication module, a Wi-Fi communication module, or other. While FIG. 4 illustrates a single expandable antenna 330, in certain embodiments, multiple expandable antennas 330 may be used.

The expandable antenna 330 shown in FIG. 4 is a dipole antenna in a compact state. Other varieties of antennas, such as loops, slots, patches, helical, or others may be used. An individual installing the control unit 102 shown in FIG. 3 may first create an aperture 406 in the exterior section 404 of the wall 402. The individual may, for example, use a drill to create the aperture 406. Having created the aperture 406, the individual may insert the expandable antenna 330 in its compact state through the aperture 406 and into the gap 420 of the wall 402.

The cable 334 may have a stopper 430 at the end farthest from the expandable antenna 330, referred to in this application as the proximal end of the cable 334. The stopper 430, in one embodiment, is a disc with a hole through the center through which the cable 334 passes. The disc may also include a cut from the hole through the center to the outer edge of the disc. The cut may allow the individual to easily slip the stopper 430 off of the cable 334. The hole through the center of the disc may be smaller than a connector for coupling the cable 334 to the antenna connector 322 discussed in connection with FIG. 3. The connector may prevent the stopper 430 from slipping off the end of the cable 334.

The stopper 430 may be sized larger than the expected size of the aperture 406. In one embodiment, the stopper 430 may have a diameter between approximately 2 and approximately 4 centimeters. The stopper 430 may prevent the cable 334 from entirely entering the gap 420. For example, in the event that the individual accidentally releases the cable 334 during the course of installation, the stopper 430 may prevent the expandable antenna 330 and cable 334 to fall into the gap 420.

Figure 5:
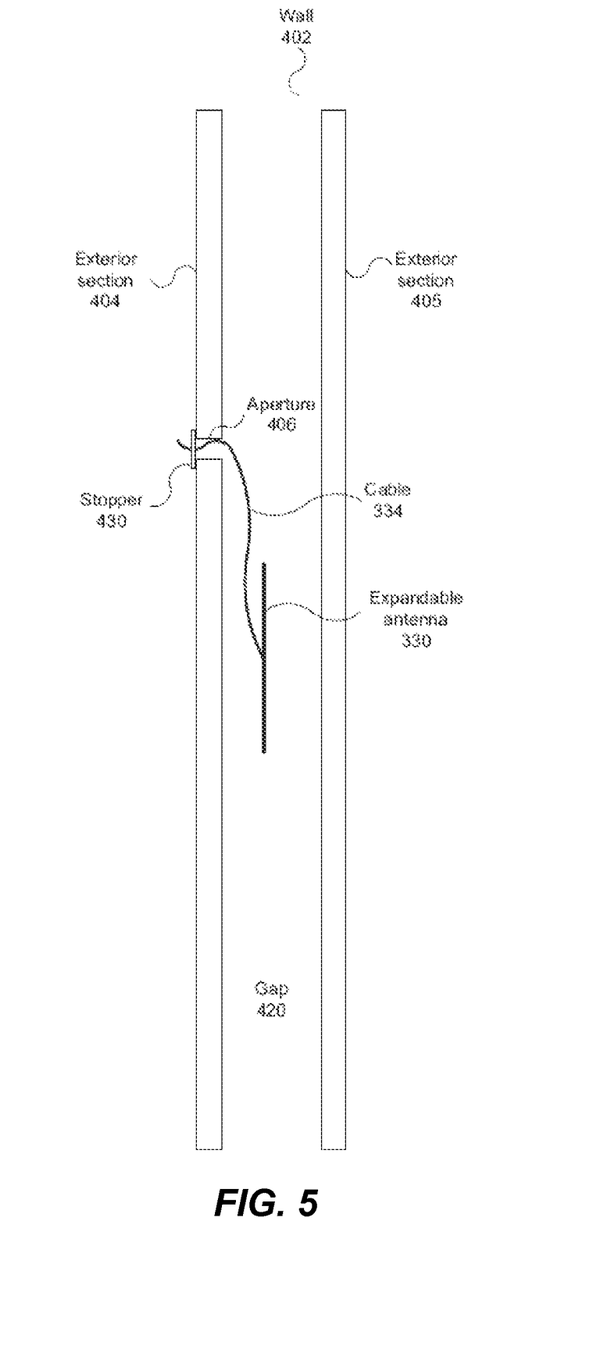
FIG. 5 is an illustration illustrating expansion of an expandable antenna in a gap within a wall according to one exemplary embodiment.

FIG. 5 illustrates the expandable antenna 330 being expanded within the wall 402. Once the expandable antenna 330 is passed, in whole or in part, through the aperture 406, the antenna 330 may expand from the compact state to the expanded state seen in FIG. 5. The individual may also feed the cable 334 through the aperture 406 to situate the expandable antenna 330 and a large section of the cable 334 within the gap 420. The stopper 430 may hold the cable 334 and the expandable antenna 330 in place while the individual may perform other installation tasks.

Figure 6:
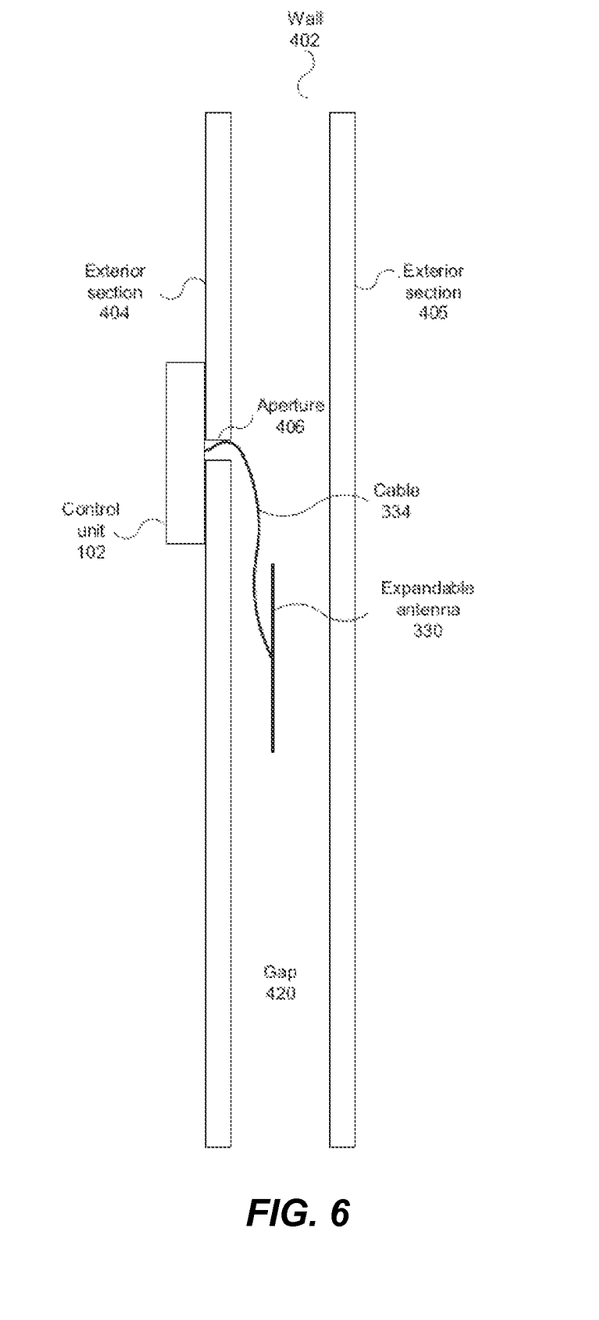
FIG. 6 is an illustration according to one exemplary embodiment illustrating an expandable antenna within a wall connected to a control unit for a security system.

FIG. 6 illustrates a control unit 102 of the security system secured to the exterior section 404 of the wall 402. The control unit 102 may be secured to the exterior section 404 of the wall 402 via a variety of approaches, including screws, mounting brackets, and other various mounting techniques. Prior to mounting the control unit 102, the individual may connect the cable 334 to the antenna connector 322. In the depicted embodiment, the casing 320 of the control unit 102 may include an aperture 324 (FIG. 3) which may be through a back panel of the casing 320. Other locations for the aperture 324 in the casing 320 are also possible. Once the cable 334 and the antenna connector 322 are connected to the control unit 102, the individual may proceed to mount the control unit 102 to the exterior section 404. In certain embodiments, the stopper 430 may be removed before mounting the control unit 102; in other embodiments, the stopper 430 may remain at the proximal end of the cable 334 when mounting the control unit 102.

Figure 7A:
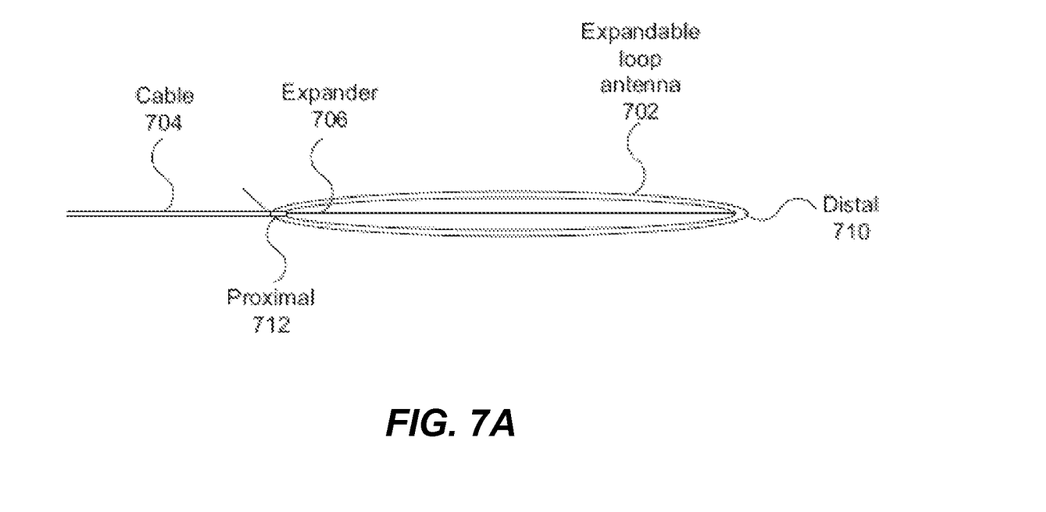
FIGS. 7A and 7B illustrate one exemplary embodiment of an expandable loop antenna.
Figure 7B:
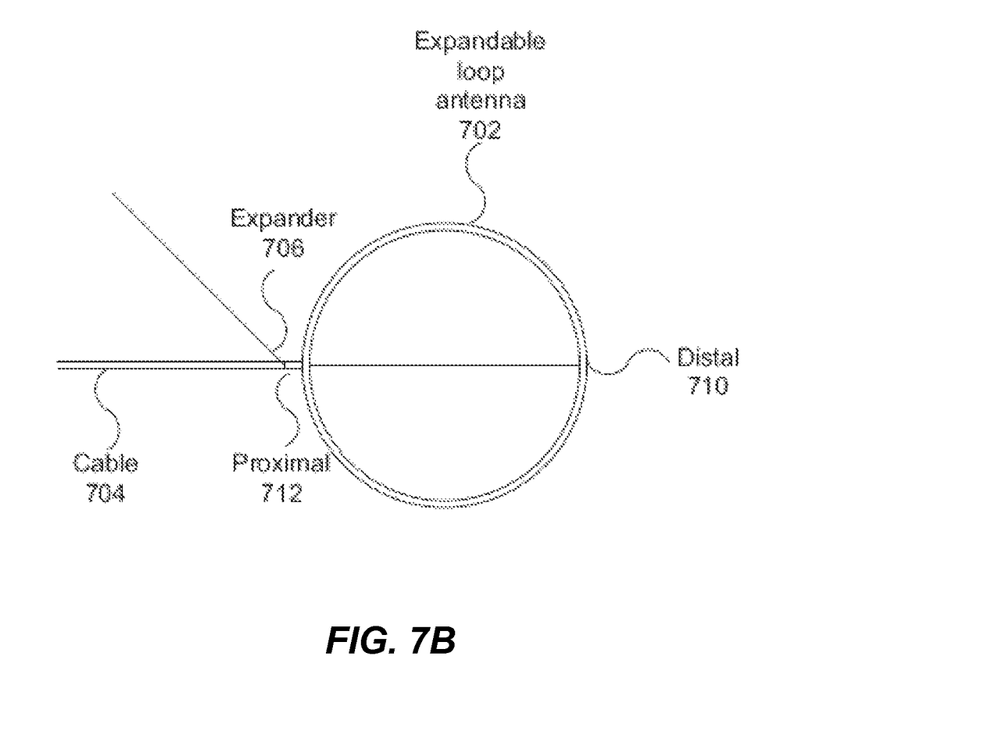

FIGS. 7A and 7B illustrate one embodiment of an expandable loop antenna 702. FIG. 7A illustrates the expandable loop antenna 702 in a compact state. In the illustrated embodiment, the compact state is an elongated state wherein an increased horizontal dimension of the expandable loop antenna 702 results in a decreased vertical dimension. This may simplify inserting the expandable loop antenna 702 into an aperture 406 in a wall 402 as discussed above in connection with FIGS. 4-6. The expandable loop antenna 702 may be flexible, but may have a default compact state.

The expandable loop antenna 702 may also include an expander 706. The expander 706 may be made of plastic, nylon, or other suitable material. The expander 706 may have an elongate cord section that attaches to a distal end 710 of the expandable loop antenna 702. A box with one or more flexible pawls may be disposed on the proximal end 712 of the expandable loop antenna 702 near the cable 704. The cord section may have one or more teeth that engage with the pawls of the box, much like a cable tie (also known as a zip tie or a tie-wrap).

FIG. 7B illustrates the expandable loop antenna 702 in its expanded state. In the depicted embodiment, the expanded state is a substantially circular loop shape. The installer may pull on the cable of the expander 706 to open the expandable loop antenna 702 from its compact state shown in FIG. 7A to the expanded state shown in FIG. 7B. The cable may have only enough teeth to convert the expandable loop antenna 702 to a loop configuration. As a result, the expandable loop antenna 702 may be transitioned to an expanded state once it is placed within the wall 402.

For example, the individual installing the expandable loop antenna 702 may insert the expandable loop antenna 702 into the wall 402 while it is in its compacted state, leaving only the proximal end 712 of the expandable loop antenna 702 accessible after insertion. The individual may then pull on the cable of the expander 706 to expand the expandable loop antenna 702. Once the expandable loop antenna 702 is in its expanded state, the individual may feed the transmission line cable 704 through the aperture 406 and complete the installation process for the control unit 102.

Figure 8A:
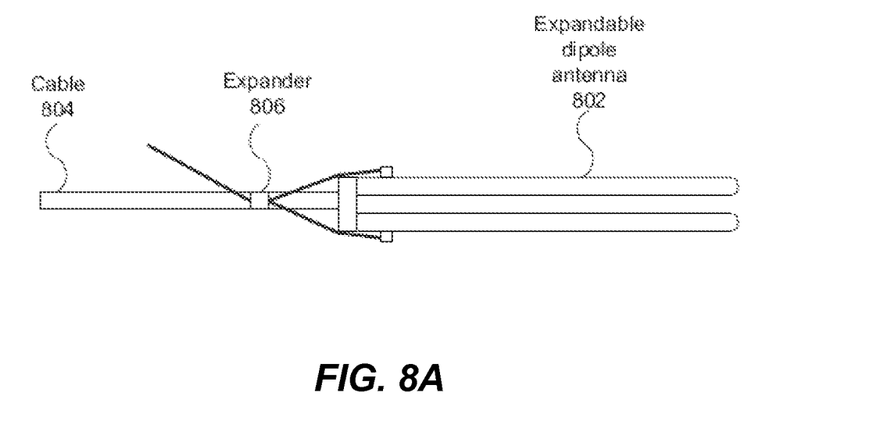
FIGS. 8A and 8B illustrate one exemplary embodiment of an expandable dipole antenna.
Figure 8B:
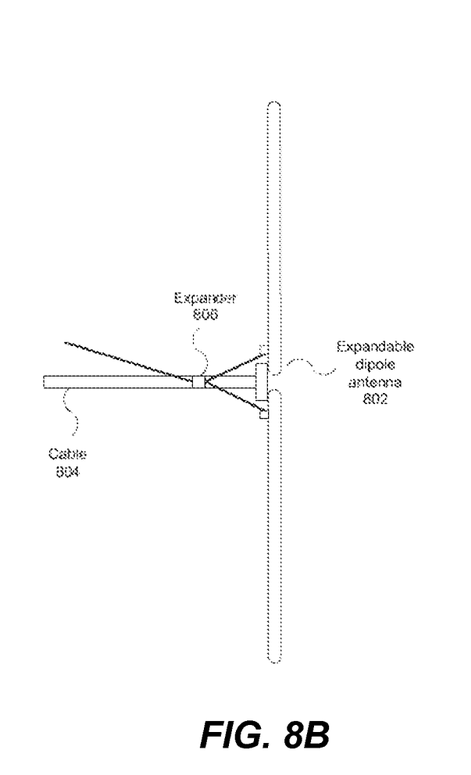

FIGS. 8A and 8B illustrate an embodiment of an expandable dipole antenna 802. FIG. 8A illustrates the expandable dipole antenna 802 in a compact state. The expandable dipole antenna 802 includes two poles which may be configured to pivot between the compact state shown in FIG. 8A, and an expanded state shown in FIG. 8B. The compact state shown in FIG. 8A has the poles of the expandable dipole antenna 802 in a substantially parallel orientation along a horizontal axis.

The expander 806 may include a cable and pawl housing similar to that described in connection with FIGS. 7A and 7B. An individual installing the expandable dipole antenna 802 may insert the expandable dipole antenna 802 in its compact state into the wall 402, and then engage the expander 806. The individual may, for example, pull on the cable shown in FIG. 8A. Pulling on the cable may cause the poles of the expandable dipole antenna 802 to extend from a substantially horizontal position to a substantially vertical position shown in FIG. 8B. As a result, the two poles of the expandable dipole antenna 802 may be substantially aligned along a vertical axis. The individual may then feed the transmission cable 804 into the wall 402 and connect the transmission cable 804 and the control unit 102.

While FIGS. 7 and 8 illustrate particular embodiments of expandable antennas 330, other varieties of antenna may also be used. For example, in some embodiments, the expandable antenna 330 may be a quad antenna, a halo antenna, or other antenna configuration. The expandable antenna 330 may be a telescoping monopole antenna. The present disclosure is not limited to a particular antenna design. In a preferred embodiment, while in a compact state, the expandable antenna 330 can pass through an aperture 406 that is approximately four inches in diameter or smaller. The aperture 406, however, need not be a circular aperture. In other embodiments, the expandable antenna 330 may be sized such that the expandable antenna 330, in its compact state, is smaller than the outer periphery of the casing 320 for the control unit 102. Such an embodiment may ensure the expandable antenna 330 can be inserted through an aperture 406 and that the aperture 406 can be adequately hidden by the control unit 102.

Figure 9:
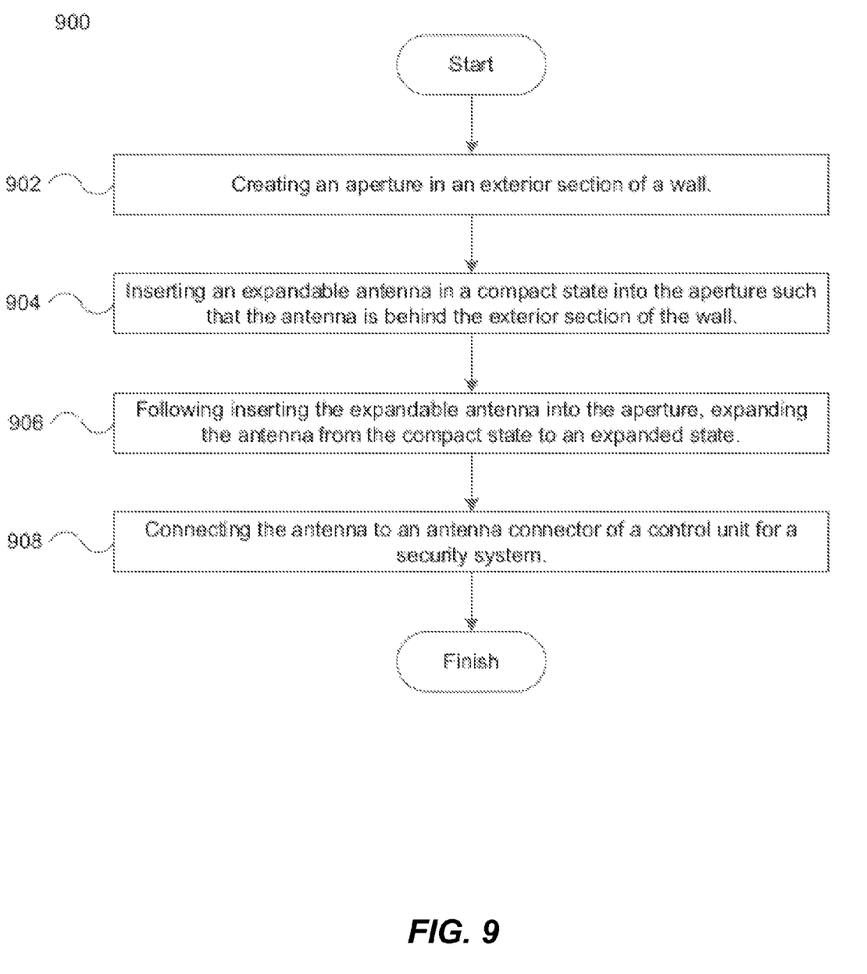
FIG. 9 is a flow chart diagram illustrating one exemplary embodiment of a method for installing an expandable antenna.

FIG. 9 illustrates one embodiment of a method 900 for installing an expandable antenna 330. The method 900 begins, at reference numeral 902, with creating an aperture 406 in an exterior section 404 of the wall 402. In a preferred embodiment, the aperture 406 is made at a location where the control unit 102 will be installed and behind the back of the control unit 102 such that the control unit 102, when mounted, will cover the aperture 406. In embodiments where a stopper 430 is situated on the cable 334, the aperture 406 may be sized such that it is smaller than the size of the stopper 430.

The method 900 may continue at reference numeral 904 with inserting the expandable antenna 330, while in its compact state, into the aperture 406 such that the expandable antenna 330 is behind the exterior section 404 of the wall 402. In one embodiment, the expandable antenna 330 is situated within a gap 420 for the wall 402.

The method 900 may also involve, at reference numeral 906, following insertion of the expandable antenna 330 into the aperture 406, expanding the expandable antenna 330 from the compact state to the expanded state. The individual may, for example, engage an expander of the expandable antenna 330. In other embodiments, the expandable antenna 330 is flexible such that the expandable antenna 330, after being compressed into the compact state to pass behind the exterior section 404, naturally changes to the expanded state once the compressing forces are removed.

The method 900 may also involve, at reference numeral 908, connecting the expandable antenna 330 to the antenna connector 322 for the control unit 102 for the security system. The antenna connector 322 may be accessible through the casing 320 for the control unit 102, which may allow easy access to the antenna connector 322. In embodiments with a stopper 430, the method 900 may also involve removing the stopper 430 before mounting the control unit 102 to the exterior section 404 of the wall 402.

In certain embodiments, the method 900 may include mounting the control unit 102 to the exterior section 404 of the wall 402. In certain embodiments, the control unit 102 may be mounted over the aperture 406 such that the aperture 406 is hidden from view. The method 900 may also involve testing the performance of the expandable antenna 330 by, for example, establishing a connection between the control unit 102 and a remote server using a GSM connection where the expandable antenna 330 enables communications over a GSM network 240.

Although the foregoing description contains many specifics, these should not be construed as limiting the scope of the disclosure or of any of the appended claims, but merely as providing information pertinent to some specific embodiments that may fall within the scopes of the disclosure and the appended claims. Features from different embodiments may be employed in combination. In addition, other embodiments of the disclosure may also be devised which lie within the scopes of the disclosure and the appended claims. The scope of the disclosure is, therefore, indicated and limited only by the appended claims and their legal equivalents. All additions, deletions and modifications to the disclosure, as disclosed herein, that fall within the meaning and scopes of the claims are to be embraced by the claims.

What is claimed:

1. A control unit for a security system, the control unit comprising:
   a casing for housing one or more internal components of the control unit for a security system;
   at least one radio-frequency communication module situated within the casing of the control unit;
   at least one antenna connector for the security system; and
   an expandable antenna external to the casing of the control unit, configured to connect to the antenna connector, the expandable antenna fitting through an aperture in a wall to which the control unit is mounted and expanding to an enlarged size within a gap of the wall.

2. The control unit of claim 1, further comprising a second radio-frequency communication module, the second radio-frequency communication module connecting to a second expandable antenna fitting within a second aperture in the wall to which the control unit is mounted.

3. The control unit of claim 1, wherein the radio-frequency communication module is a Global System for Mobile Communications (GSM) communication module.

4. The control unit of claim 1, wherein the expandable antenna connects to a cable component that communicatively connects the expandable antenna to the antenna connector.

5. The control unit of claim 4, further comprising a stopper component at a proximal end of the cable component opposite the expandable antenna, the stopper component preventing the proximal end of the cable component from passing through the aperture in the wall.

6. The control unit of claim 1, wherein the expandable antenna is a loop antenna comprising an expander configured to expand the loop antenna from an elongated shape to a substantially circular loop shape.

7. The control unit of claim 1, wherein the expandable antenna is a dipole antenna comprising an expander that changes the orientation of a first pole of the dipole antenna to a second pole of the dipole antenna from substantially parallel orientation to a substantially aligned orientation.

8. A security system comprising:
   a plurality of sensors communicatively connected to a control unit for the security system;
   the control unit comprising:
      a casing housing one or more internal components of the control unit for a security system;
      a Global System for Mobile Communications (GSM) communication module situated within the casing of the control unit, the GSM communication module comprising an antenna connector accessible from an exterior of the casing of the control unit;
   an expandable in-wall antenna configured to connect to the antenna connector, the expandable in-wall antenna fitting within an aperture in the wall while in a compact state and expanding to an expanded state inside the wall.

9. The security system of claim 8, further comprising the GSM communication module communicatively connecting the control panel with a remote server over a GSM network.

10. The security system of claim 8, wherein the control unit further comprises a Z-Wave communication module that communicates with one or more electronic devices according to the Z-Wave communications protocol, the Z-Wave communication module further comprising a Z-Wave antenna situated within the case of the control unit.

11. The security system of claim 8, wherein the control unit further comprises a Z-Wave communication module that communicates with one or more electronic devices according to the Z-Wave communications protocol, the Z-Wave communication module further comprising an expandable in-wall Z-Wave antenna that connects to a Z-Wave antenna connector of the Z-Wave communications module, the expandable in-wall Z-Wave antenna fitting within a second aperture in the wall while in the compact state and expanding to the expanded state inside the wall.

12. The security system of claim 8, wherein the expandable in-wall antenna is a loop antenna.

13. The security system of claim 8, wherein the expandable in-wall antenna is a dipole antenna.

14. The security system of claim 8, wherein the expandable in-wall antenna is a telescoping monopole antenna.

15. The security system of claim 8, wherein the expandable in-wall antenna comprises an expander connected to the expandable in-wall antenna that, in response to being engaged, expands the expandable in-wall antenna from the compact state to the expanded state.

16. A method comprising:
   creating an aperture in an exterior section of a wall;
   inserting an antenna in a compact state into the aperture such that the antenna is behind the exterior section of the wall;
   following inserting the antenna into the aperture, expanding the antenna from the compact state to an expanded state; and
   connecting the antenna to an antenna connector of a control unit for a security system.

17. The method of claim 16, further comprising mounting the control unit to the exterior section of the wall.

18. The method of claim 16, further comprising establishing a connection between the control unit and a remote server using a Global System for Mobile Communications (GSM) connection, the GSM connection established using the antenna.

19. The method of claim 16, wherein creating the aperture comprises creating an aperture having a size smaller than a size of a stopper component of the antenna.

20. The method of claim 19, further comprising removing the stopper component.

* * * * *